United States Patent [19]

Wada

[11] Patent Number: 5,028,146
[45] Date of Patent: Jul. 2, 1991

[54] APPARATUS AND METHOD FOR MEASURING TEMPERATURES BY USING OPTICAL FIBER

[75] Inventor: Ichiro Wada, Yokohama, Japan

[73] Assignee: Kabushiki Kaisha Toshiba, Kawasaki, Japan

[21] Appl. No.: 525,725

[22] Filed: May 21, 1990

[51] Int. Cl.⁵ .................... G01N 21/65; G01J 5/10
[52] U.S. Cl. .................... 374/131; 374/129; 374/130
[58] Field of Search ............ 374/127, 131, 129, 130, 374/121, 123; 356/43, 44, 301; 250/227, 340; 73/338, 338.3

[56] References Cited

U.S. PATENT DOCUMENTS

| | | | |
|---|---|---|---|
| 2,915,898 | 12/1959 | Van Luik, Jr. | 73/77 |
| 3,986,775 | 10/1976 | Chang et al. | 356/301 X |
| 4,008,961 | 2/1977 | Barrett et al. | 356/301 |
| 4,673,299 | 6/1987 | Dakin | 374/131 |
| 4,767,219 | 8/1988 | Bibby | 374/131 X |
| 4,823,166 | 4/1989 | Hartog et al. | 374/131 X |

FOREIGN PATENT DOCUMENTS

2140554 11/1984 United Kingdom ............... 374/131

Primary Examiner—William A. Cuchlinski, Jr.
Assistant Examiner—G. Bradley Bennett
Attorney, Agent, or Firm—Oblon, Spivak, McClelland, Maier & Neustadt

[57] ABSTRACT

An optical fiber is installed to pass through a plurality of measurement places. Predetermined positions in the optical fiber are set at a predetermined temperature. When an optical signal is radiated on the optical fiber, Raman scattering occurs at various portions of the optical fiber. The intensities of the Raman scattered light components depend on temperatures. Backscattered light components of the Raman scattered light are sampled and stored in a memory. A temperature distribution on the optical fiber is obtained on the basis of the stored data. The temperatures of the mesurement places can be specified on the basis of the predetermined temperature on the obtained temperature distribution as a reference. The temperatures of the measurement places can be corrected on the basis of the predetermined temperature.

16 Claims, 7 Drawing Sheets

APPARATUS AND METHOD FOR MEASURING TEMPERATURES BY USING OPTICAL FIBER

BACKGROUND OF THE INVENTION

1. Field of the Invention

The present invention relates to a measuring apparatus and method for measuring the temperature, humidity, temperature distribution, or the like in a measurement region by radiating an optical signal onto the incidence end of an optical fiber arranged in the measurement region and analyzing backscattered light.

2. Description of the Related Art

Generally, when an optical signal having a frequency $\omega$ is radiated on a substance, the optical signal is scattered by the substance and a part of the scattered optical signal returns toward the radiation point. If this returning light is observed by optical time domain reflectometry (OTDR), light components having frequencies different from frequency $\omega$, e.g., frequencies $\omega + \omega r$, and $\omega \pm m\omega r$ (m=an integer) are measured in addition to a light component having the frequency $\omega$, i.e., Raman scattered light is measured.

The intensity of Raman scattered light depends on temperatures. Since Raman scattered light is influenced by trace amounts of impurities or various molecules in an optical fiber, the application of Raman scattered light to temperature measurement was originally considered as difficult. However, with the progress of the manufacture and application techniques of optical fibers, use of optical fibers as thermometers has been studied.

A technique of using an optical fiber as a thermometer is disclosed, for example, in "New fiber optic distributed temperature sensor", SPIE Vol. 798 Fiber Optic Sensors II 1987 pp. 131 to 136, or in UK Patent Application GB 2140554A. The disclosures of these references are incorporated by reference in the specification.

In such a thermometer, backscattered light from each point of an optical fiber is weak, and noise is mixed in this weak optical signal. In addition, optical fibers slightly differ in characteristics from each other. For these reasons, it is very difficult to discriminate temperature measurement positions of an optical fiber and to accurately measure temperatures at the respective positions.

Under the circumstances, a technique of removing noise by averaging data obtained by radiating optical signals from thousands to tens of thousands of times is proposed. Even with this technique, however, high-fidelity measurement is very difficult to perform.

Even if measurement is performed by Optical Frequency Domain Reflectometry (OFDR) instead of OTDR accurate detection of a measurement position and accurate measurement of a temperature at the measurement position are difficult to perform for the same reasons as in measurement by OTDR.

In addition, in a conventional system, the intensities of backward Raman scattered light components are stored in an internal memory once, and data processing is subsequently performed. For this reason, unnecessary signals are stored in the internal memory. This undesirably increases the required memory capacity.

SUMMARY OF THE INVENTION

The present invention has been made in consideration of the above situation, and has as its object to provide an improved fiber optic distributed temperature sensor.

It is another object of the present invention to provide a measuring apparatus which can accurately measure a temperature and a humidity at an arbitrary measurement place in a measurement region and the temperature distribution of the region, and can increase measurement sensitivity and resolution.

In order to achieve the above objects, according to the present invention, there is provided an apparatus for measuring a temperature of an optical fiber by radiating light on the optical fiber and measuring Raman scattered light generated in the optical fiber, comprising:

optical fiber means which is installed to pass through at least one place where a temperature is to be measured and transmits light;

a light source for radiating light on the fiber means;

receiving means for receiving Raman scattered light, which is generated in the optical fiber means in response to the light radiated on the optical fiber, as a signal;

calculating means for analyzing the signal received by the receiving means and calculating a position at which the Raman scattered light is generated and a temperatures at the position; and adding means for adding a signal representing at least one of the position at which the Raman scattered light component is generated and a predetermined temperature to the signal constituted by the Raman scattered light component.

In addition, according to the present invention, there is provided a method comprising the steps of:

installing an optical fiber to pass through at least one temperature measurement place;

radiating an optical signal on the optical fiber and continuously generating Raman scattered light;

receiving the Raman scattered light, and measuring a temperature of the optical fiber on the basis of the received Raman scattered light; and adding a signal representing a predetermined position or temperature of the optical fiber to the Raman scattered light, the signal being constituted by the Raman scattered light.

With the above-described arrangement, according to the apparatus and method of the present invention, signals representing positions and/or temperatures can be added to Raman scattered light components by techniques, e.g., setting portions of the optical fiber means at a predetermined temperature, and forming portions where Raman scattering occurs at high rates. Therefore, positions where Raman scattering occurs can be specified and actually measured temperatures can be corrected by using these signals in the calculating means, the measuring step, or the like. Thus, the resolution, sensitivity, and the like of the apparatus and method of the present invention can be improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 9 to 12B are views for explaining the third embodiment of the present invention;

FIGS. 13 to 15C are views for explaining the fourth embodiment of the present invention;

DETAILED DESCRIPTION OF THE PREFERRED EMBODIMENTS

Embodiments of the present invention will be described below. A common principle of measurement of temperatures on which the following embodiments are based will be described first.

When light having a frequency $\omega$ is radiated on a substance having a frequency $\omega r$ at which molecular vibration or lattice vibration occurs, scattered light components having a frequency $\omega + \omega r$ as well as the frequency w are radiated from the substance. Especially, when a high-intensity laser beam is radiated on the substance, stimulated light having the frequency $\omega + \omega r$ or $\omega \pm m\omega r$ (m = an integer) is generated due to stimulated emission. A part of this stimulated light propagates in the incident direction of the laser beam. That is, backscattered light is generated. The intensities of light components included in the backscattered light and having the frequency $\omega + \omega r$, $m \pm m\omega r$, and the like depend on temperatures at positions where the light components are stimulated. Therefore, positions where the backscattered light components are generated and data such as temperatures at the positions can be obtained by measuring the intensities of the back-scattered light components having the frequencies $\omega + \omega$ and $\omega \pm m\omega r$, and performing proper processing.

Figure 1:
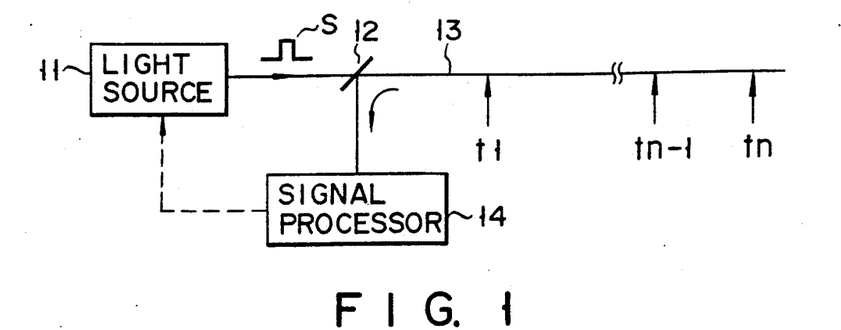
FIGS. 1 and 2 are views for explaining a principle of measurement of temperatures by means of an optical fiber.
Figure 2:
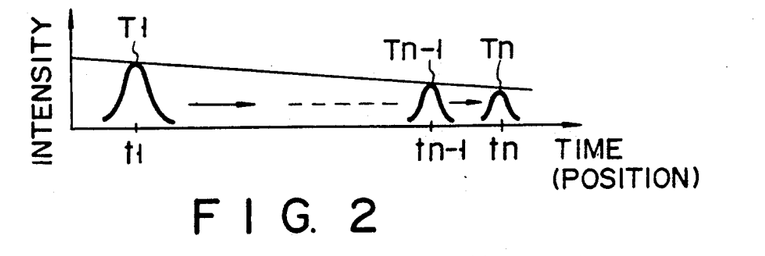

A basic arrangement and operation of a thermometer based on the above-described principle will be described below with reference to FIG. 1. Referring to FIG. 1, a light source 11 generates a light pulse S. The light pulse S is radiated on the incidence end of an optical fiber 13 through a beam splitter 12. Raman scattered light components having frequencies $\omega + \omega r$ and $\omega \pm m\omega r$ are sequentially generated at various positions of the optical fiber 13, e.g., positions t1, ... tn-1, and tn. As a result, backscattered light components return from the respective positions t1, ... tn-1, and tn to the incidence end of the optical fiber 13. The light components returning to the incidence end are reflected by the beam splitter 12 and are guided to a signal processor 14. Assume that temperatures at the positions t1, ... tn-1, and tn are respectively represented by T1, ... Tn-1, and Tn, and T1 = T2 = ... = Tn-1 = Tn. In this case, since the loss of scattered light is increased with an increase in distance from the incidence end, the signal level is gradually decreased. FIG. 2 shows the intensities of the Raman scattered light components received by the signal processor 14. The signal processor 14 measures the time interval between the instant at which a laser beam is radiated and the instant at which a scattered light component returns to the incidence end.

In addition, the signal processor 14 obtains the position at which a backscattered light component is generated on the basis of a measured time interval and a light velocity (obtained from a refractive index) in the optical fiber 13.

The backscattered light received by the signal processor 14 includes light components having frequencies $\omega$, $\omega + \omega r$, $\omega \pm m\omega r$, and the like. The signal processor 14 extracts the light components having the frequencies $\omega + \omega r$, $\omega + m\omega r$, or $\omega + \omega r$ and $\omega - m\omega r$ by using a characteristic filter, a multiplexer, or the like, and obtains (calculate) temperatures on the basis of the intensities of the extracted light components and a known calculation method.

Note that if an element serving as both a light source and a photodetector is used, the beam splitter 12 can be omitted.

Figure 3:
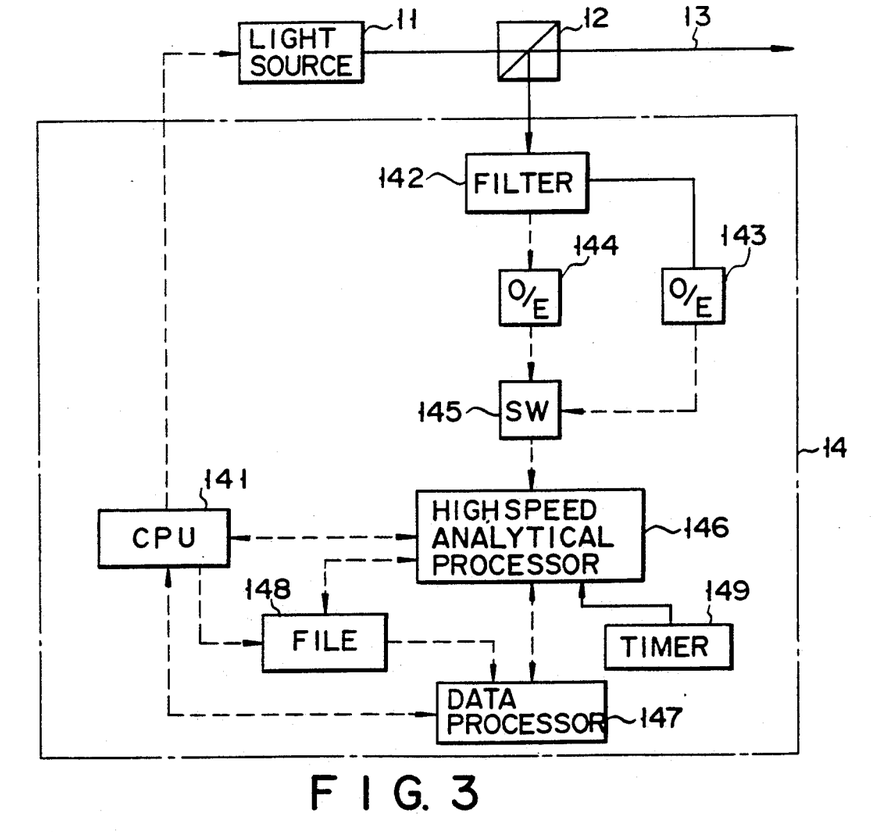
FIG. 3 is a block diagram showing an arrangement of an OTDR commonly used in embodiments of the present invention.

An arrangement of the light source 11, the beam splitter 12, the optical fiber 13, and the signal shown in FIGS. 4 to 19, will be described below with reference to FIG. 3.

The light source 11 is constituted by, e.g., a laser oscillator, a light-emitting diode, or the like. The light source 11 outputs a pulse of light having the frequency $\omega$ in response to a command from the signal processor 14. This light pulse is supplied to the optical fiber 13 through the beam splitter 12. The beam splitter 12 is constituted by, e.g., a combination of two prisms.

The signal processor 14 includes a CPU 141 for outputting various commands on the basis of a sequence program. Backscattered light components of Raman scattered light generated in the optical fiber 13, which return to the incidence end of the optical fiber 13, are incident on an extracting or filter circuit 142 through the beam splitter 12. The extracting circuit 142 extracts light components having the frequencies $\omega$, $\omega + \omega r$, and $\omega \pm m\omega r$ from the incident light. The light component having the frequency $\omega$ is supplied to an optical-to-electrical converter 143. The light components having the frequencies $\omega + \omega r$ and $\omega \pm m\omega r$ are supplied to an optical-to-electrical converter 144. The optical-to-electrical converters 143 and 144 respectively output electrical signals having signal levels corresponding to the intensities of the input light components.

The electrical signal obtained by the optical-to-electrical converters 143 and 144 upon conversion, i.e., the signal based on Raman scattering, is supplied to a high speed analytical processor 146 directly or through a switch circuit 145. The high speed analytical processor 146 measures time intervals (positions) and signal intensities equivalent to temperatures corresponding to the time intervals on the basis of a timing signal which is input in synchronism with an operation command from the CPU 141 to the light source 11 and clock signals from a timer 149, and stores them in a built-in memory. A file 148 stores data, e.g., data obtained by mapping the positions of heat sources in a measurement region (to be described later). A data processor 147 performs desired processing by using the data stored in the high speed analytical processor 146 and the data in the file 148, as needed.

The embodiments of the present invention will now be described below.

Figure 4:
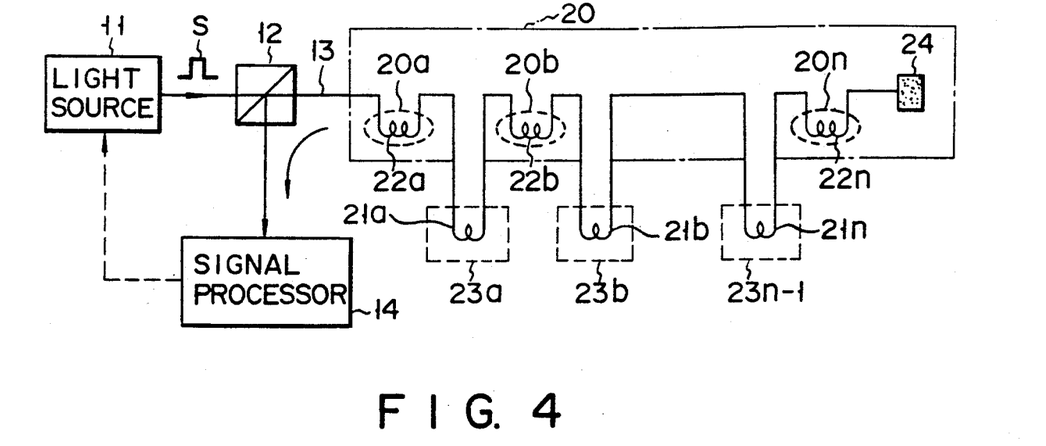
FIGS. 4 to 6 are views for explaining the first embodiment of the present invention.

An embodiment of the present invention will be described first with reference to FIG. 4. Referring to FIG. 4, reference numeral 20 denotes a measurement region corresponding to a building, a tank, or the like in which, for example, temperatures are to be measured. The optical fiber 13 is installed to extend over a plurality of measurement places 20a, 20b, ..., and 20n (where temperatures are to be actually measured). Portions (measurement portions) of the optical fiber 13 on the measurement places 20a, 20b, ..., 20n (not shown) are denoted by reference numerals 22a, 22b, ..., 22n, respectively. Portions 21a, 21b, ..., 21n-1 of the optical fiber 13 between the respective measurement places 20a and 20b, 20b and 21c (not shown), ..., 21-n-1 and 21-n are extended outside the measurement region 20. The extended portions 21a, 21b, ..., and 21n-1 are set at a temperature, e.g., 0° C., which is sufficiently deviated from a temperature at the measurement region, e.g., about 20° C., by isothermal chambers 23a, 23b, ..., respectively. The distal end of the optical fiber 13 is inserted in a liquid 24 such as a silicone oil, a paraffine oil, or the like. With this arrangement, light emerging from the distal end of the optical fiber 13 is diffused in the liquid 24. Therefore, the light which returns to the optical fiber 13 decreases. If light reflected by the distal end of the optical fiber 13 is amplified by the signal processor 14, an amplifier may be saturated and measurement of temperatures may become impossible. The liquid 24 is arranged to prevent this.

Figure 5:
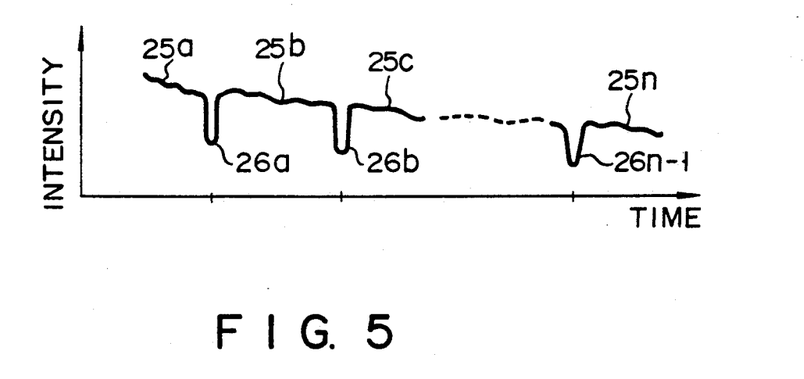

An operation of a temperature measuring apparatus having the arrangement shown in FIG. 4 will now be described below. A light source 11 radiates a light pulse S onto the optical fiber 13. The signal processor 14 processes backscattered light returning from the optical fiber 13. As a result, the intensity distribution of backscattered light components having frequencies $\omega$ and $\omega \pm m\omega r$ shown in FIG. 5 is obtained. Referring to FIG. 5, reference numerals 25a, 25b, ... respectively denote the intensities of Raman scattered light components from the measurement portions 22a, 22b, ..., and 22n located at the measurement places 20a, 20b, .... Reference numerals 26a, 26b, ... respectively denote the intensities of backscattered light components from the cooled portions 21a, 21b, ..., and 21n-1 of the optical fiber 13. In addition, the intensities 26a, 26b, ..., and 26n-1 respectively indicate a temperature of 0° C. set by the isothermal portions 23a, 23b, .... That is, a signal indicating a temperature (0° C.) and a position where the temperature is set is added or induced to a backscattered light component.

The high speed analytical processor 146 stores the signal shown in FIG. 5 in the built-in memory.

The file 148 stores data, e.g., data representing that the first lower peak in the intensity distribution in FIG. 5 corresponds to the first extended portion 21a and the second and subsequent lower peaks respectively correspond to the second and subsequent extended portions 21b to 21n-1, and that the first measurement portion 22a is located, e.g., 5 m ahead of the first extended portion 21a, and the second measurement portion 22b is located in the middle of the first and second extended portions 21a and 21b.

The data processor 147 obtains signal levels corresponding to the measurement portions 22a, 22b, ... on the basis of the positions of the lower peaks in the intensity distribution shown in FIG. 5. For example, the signal level corresponding to the measurement portion 22b is a signal level located at the middle position between the first and second lower peaks 26a and 26b. The signal level corresponding to the measurement portion 22a is a signal level located at the position 5 m ahead of the first lower peak 26a. With such a technique, signals corresponding to measurement portions can be accurately specified.

The data processor 147 may obtain signal levels corresponding to the measurement portions 22a, 22b, ... by measuring time intervals between the instant of radiation of a light pulse and the instant of reception of backscattered light. In addition, the data processor 147 may use either one of data sets representing the positions of the measurement portions obtained on the basis of the positions of the lower peaks 26a, 26b, ... and representing the positions of the measurement portions obtained from the transmission time of the light pulse as the main data set while using the other as the complementary data set.

When the signal levels corresponding to the measurement portions 22a, 22b, ... are obtained, the data processor 147 obtains temperatures at the measurement portions 22a, 22b, ... on the basis of the signal levels. In this case, the signal levels at the lower peaks 26a, 26b, ... correspond to a temperature of 0° C. By using the signal levels at the lower peaks 26a, 26b, ..., the temperatures at the measurement portions 22a, 22b, ... can be calibrated. An example of calibration will be described below.

The data processor 147 obtains temperatures corresponding to, e.g., the signal levels at the lower peaks 26, 26b, .... If an obtained temperature is different from 0° C., the data processor 147 performs calibration (correction) so as to cause the obtained temperature to coincide with 0° C. by various techniques, e.g., correcting a constant of a formula for obtaining temperatures; adding or subtracting a predetermined value to or from the calculated temperature; and multiplying the obtained temperature by a predetermined value. In addition, the data processor 147 calculates temperatures at the respective measurement portions 22a, 22b, .... The data processor 147 then corrects the temperatures of the measurement portions 22a, 22b, in the same manner as in correction of the temperatures of the adjacent extended portions. For example, if the temperature of an extended portion is increased by +1° C. for correction, the temperature of its adjacent measurement portion is also increased by +1° C.

As described above, according to this embodiment, components of Raman scattered light included in backscattered light, which correspond to the respective measurement portions, can be accurately and easily specified. In addition, the temperatures of the measurement portions can be calibrated (corrected) on the basis of the temperatures of the extended portions, and hence accurate measurement of temperatures can be performed.

In the above-described embodiment, the temperature (0° C.) of each extended portion is set to be lower than that (about 20° C.) of each measurement portion. However, the temperature of each extended portion may be set to be higher than that of each measurement portion. In this case, a plurality of upper peaks appear on the level distribution graph in FIG. 5, and these upper peaks respectively correspond to backscattered light components from the extended portions.

In FIG. 4, the measurement portions and the extended portions are alternately arranged. However, the present invention is not limited to such an arrangement. For example, one extended portion may be arranged for a plurality of measurement portions.

In the above description, the temperatures of the isothermal chambers 23a, 23b, . . . are set to be sufficiently different from those of the measurement portions. However, if the reference temperature of each extended portion is set so as not to be much different from a temperature at a corresponding measurement place, an actually measured temperature at each measurement place can be more accurately calibrated (corrected). Similarly, if the temperatures of the isothermal chambers 23a, 23b, . . . are set to be variable, and the reference temperature is set to be variable, an actually measured temperature at each measurement place can be more accurately calibrated (corrected).

In addition, in the above-described embodiment, the extended portions are formed, and the optical fiber is set at the reference temperature outside the measurement region. However, part of the optical fiber may be set at a predetermined reference temperature inside the measurement region without extending the optical fiber outside the measurement region.

Furthermore, instead of setting part of the optical fiber at the reference temperature, a temperature at a predetermined position may be actually measured, and this measured temperature may be used as a reference temperature.

In cases wherein part of the optical fiber is set at a temperature which is not much different from that of a measurement portion, and the temperature of part of the optical fiber is actually measured to be used as a reference temperature, no clear upper and lower peaks are generated in the signal level distribution graph of backscattered light. In this case, the signal processor 14 may specify the position of each measurement portion and the like by using the time intervals between the instant of radiation of a light pulse and the instant of reception of the backscattered light.

Note that various means such as heaters and cooling devices can be used as well as the isothermal chambers as long as part of the optical fiber can be set at a reference temperature.

FIG. 4 shows the measurement portions 22a, 22b, . . . , and the extended portions 21a, 21b, . . . in the form of a coil. With this arrangement, since the optical fiber in the isothermal chambers 23a, 23b, . . . and at the measurement places 20a, 20b, . . . can be increased in length, the isothermal chambers 23a, 23b, and the measurement places 20a, 20b, . . . can be relatively easily specified. However, the present invention is not limited to this, but the extended portions, the measurement portions, and the like may have a non-winding arrangement.

In FIG. 4, the optical fiber 13 is installed to continuously extend in one direction. However, the installation form of the optical fiber 13 varies depending on an object to be measured.

Figure 6:
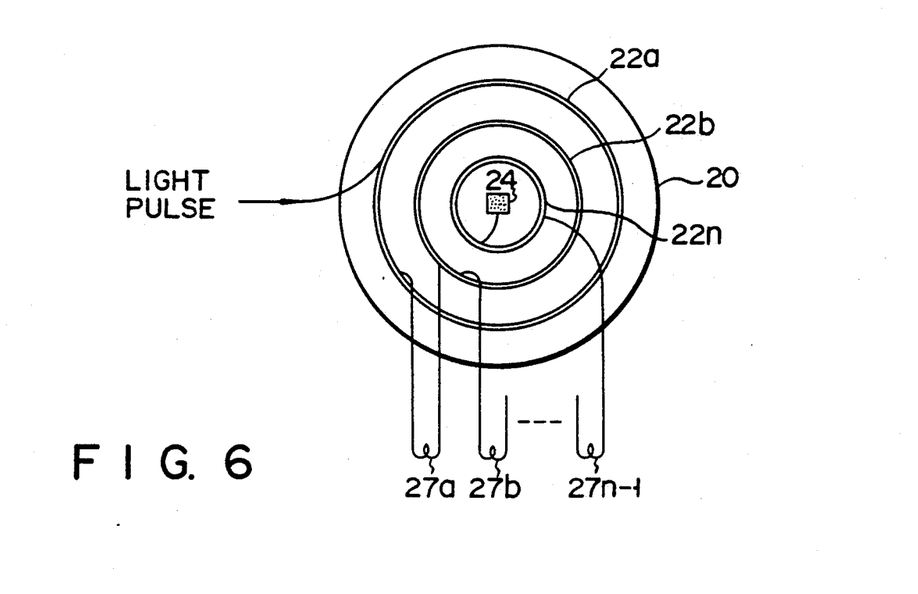

For example, if the average temperature of n spherical surfaces separated from the center of a spherical tank by predetermined distances is to be measured, an optical fiber 13 may be arranged as shown in, e.g., FIG. 6. Referring to FIG. 6, a measurement portion 22a is wound around the outermost spherical surface in a tank as a measurement region 20, while a measurement portion 22b is wound around the second outermost spherical surface and a measurement portion 22n is wound around the innermost spherical surface. In order to set distinctive boundaries among the respective adjacent measurement portions 22a, 22b, and 22c, segmenting fibers 21a, 21b, . . . , and 21n-1 which are set at a predetermined temperature are formed between the respective adjacent measurement portions.

In the arrangement shown in FIG. 6, backscattered light components from the measurement portions can be clearly distinguished due to backward Raman scattered light components from the segmenting fibers 27a, 27b, 27n-1. In addition, the temperatures of the measurement portions 22a, 22b, . . . 22n can be calibrated in accordance with the intensities of the backward Raman scattered light components from the segmenting fibers 27a, . . . , and 27n-1.

In the arrangement shown in FIG. 6, since a long optical fiber is wound at each measurement place in the form of a spherical surface, the average temperature of the respective spherical surfaces can be relatively accurately measured by averaging temperatures obtained on the basis of the Raman scattered light components from the measurement portions 22a, 22b, . . . .

Note that the optical fibers at the measurement portions 22a, 22b, . . . may be wound in the form of a circle by one turn or a plurality of turns. An object to be measured is not limited to a tank. For example, if a pond is to be measured, the same effect as described with reference to FIG. 6 can be obtained by arranging an optical fiber 22 along the shape of the pond.

In the embodiment shown in FIG. 6, since position signals can be extracted from the segmenting fibers 27a, 27b, . . . , not only an average temperature but also a temperature at a specific position can be measured.

The second embodiment of the present invention will now be described below with reference to FIG. 7. The arrangement shown in FIG. 7 differs from that shown in FIG. 4 in that connecting portions 28a, 28b, . . . include weld portions that are formed between measurement portions 22a and 22b, 22b and 22c, . . . .

Figure 8:
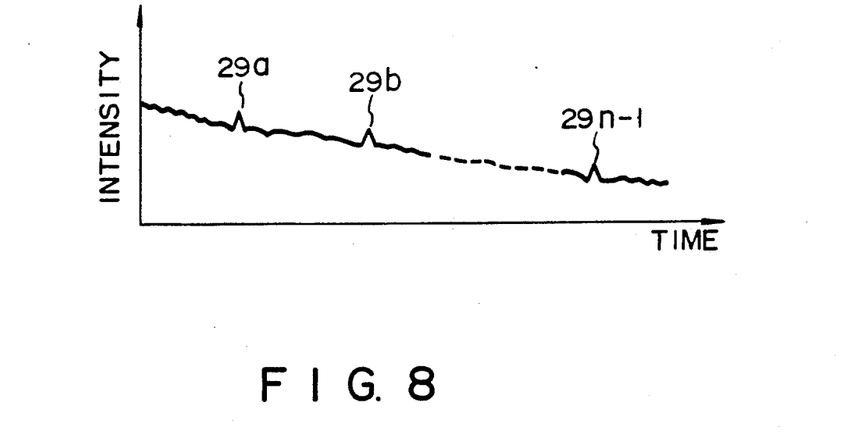

The intensities of Raman scattered light components returning from the connection portions 28a, 28b, . . . are higher than those of light components returning from other portions, as indicated by reference numerals 29a, 29b, . . . , and 29n-1 in FIG. 8. In other words, signals representing the positions of the connection portions 28a, 28b, . . . are added or induced to the Raman scattered light components. Therefore, the positions of the connection portions 28a, 28b, . . . can be specified from the intensities 29a, 29b, . . . , and the positions of the respective measurement portions 22a, 22b, . . . can be specified on the basis of the positions of the connection portions, thereby allowing measurement of temperatures at the measurement portions 22a, 22b, . . . . The connection portions need not be arranged between all the measurement portions, but may be arranged as needed.

Figure 9:
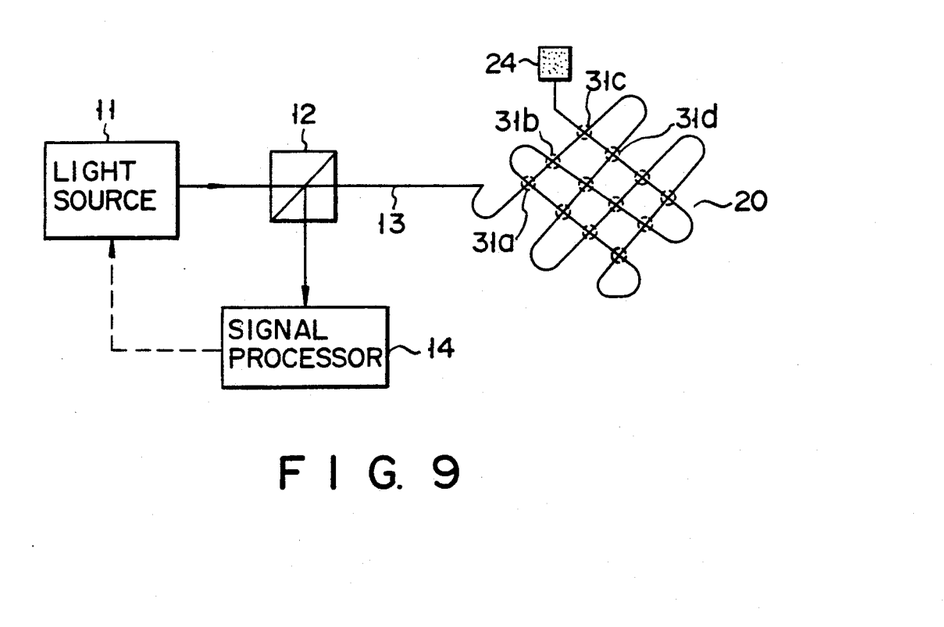

The third embodiment of the present invention will now be described below with reference to FIGS. 9 to 12. FIG. 9 shows a method of installing an optical fiber 13 when temperature measurement positions are distributed on a flat surface. The optical fiber 13 is installed to form a meandering path in a measurement region 20 in one direction and to zigzag to substantially perpendicularly cross the zigzag path, thus finally forming a mesh-like structure. Portions of the optical fiber 13 which cross each other constitute measurement portions 31a, 31b, . . . .

Figure 10:
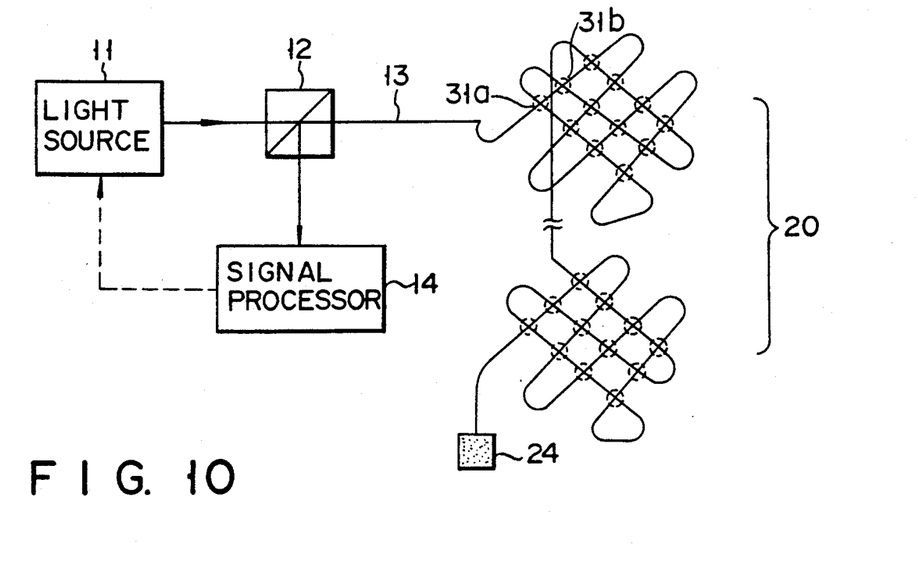
Figure 11:
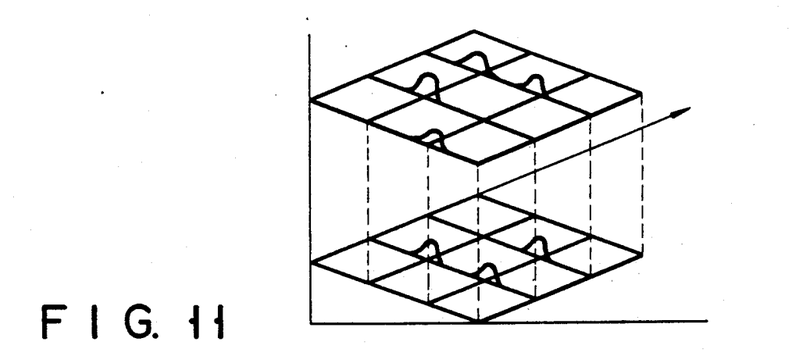

FIG. 10 shows a case wherein a plurality of meshlike optical fibers, each of which is formed in the same manner as described with reference to FIG. 9, are arranged such that the optical fiber 13 is formed into a three-dimensional structure. FIG. 11 schematically shows the arrangement in FIG. 10. In temperature measuring apparatuses having the arrangements shown in FIGS. 9 and 10, the temperatures of the measurement portions 31a, 31b, . . . are measured in the following procedure with the heaters or cooling devices.

Reference signals representing only positions or positions and temperatures are acquired from the respective measurement portions 31a, 31b, . . . . A method of acquiring reference signals will be described below. The measurement portions 31a, 31b, . . . are separately or simultaneously set at a predetermined temperature, which is sufficiently different from the temperature of the measurement region 20, by using the heaters, the cooling devices, or the like. Subsequently, the light source 11 is driven to radiate the light pulse S on the optical fiber 13.

Figure 12A:
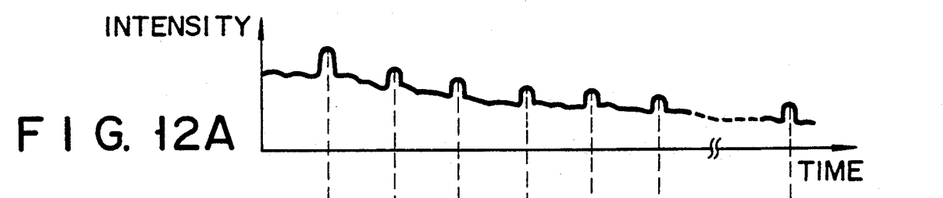
Figure 12B:
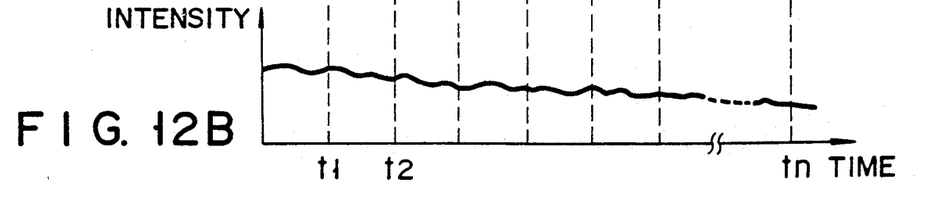

The intensity data of backscattered light components which return to the incidence end upon Raman scattering in the optical fiber 13 are supplied to the high speed analytical processor 146 through the characteristic filter or extracting circuit 142 (FIG. 3) and the optical-to-electrical converter 145 (FIG. 3), and are time-serially processed. In this case, back-scattered light components having intensities different from those of other light components are supplied from the respective measurement portions 31a, 31b, . . . at time t1, time t2, . . . (reference positions), . . . , as shown in FIG. 12A. The data processor 147 measures (calculates) temperatures (reference temperatures) at the positions corresponding to time t1, time t2, . . . on the basis of signal levels at time t1, time t2, . . . , and sequentially stores the time and the temperature in the file 148 (FIG. 3).

When the reference positions and temperatures are acquired, the heaters, the cooling devices, or the like are detached, and the measurement portions 31a, 31b, . . . are at the same temperature as that of the measurement region 20.

In actual measurement of temperatures, the respective measurement portions 31a, 38b, . . . are not set at a specific temperature. A light pulse is radiated on the incidence end of the optical fiber 13. The signal processor 14 receives and stores backward Raman scattered light components. In addition, the signal processor 14 measures a time from the instant at which the light pulse is incident on the incidence end, and detects the intensities of backward Raman scattered light components at the reference times t1, t2, t3, . . . , thereby measuring the temperatures of the measurement portions 31a, 31b, . . . on the basis of the detected intensities. Since two data are obtained from one measurement portion, a more accurate value can be obtained by averaging the two data.

The actually measured temperatures may be corrected (calibrated) by using the above-described reference temperatures.

In FIGS. 9 and 10, all the crossing portions of the mesh-like structures are used as the measurement portions, but only some of the crossing portions may be used as measurement portions. Alternatively, portions other than the crossing portions may be used as measurement portions. The optical fiber 13 need not always be installed in the form of a mesh-like structure. For example, it may be installed to connect angles of a polygon. In addition, portions of the optical fiber need not cross each other. For example, the optical fiber may be arranged such that its portions are in contact or very close with each other.

The fourth embodiment of the present invention will now be described below with reference to FIGS. 13 to 15.

Figure 13:
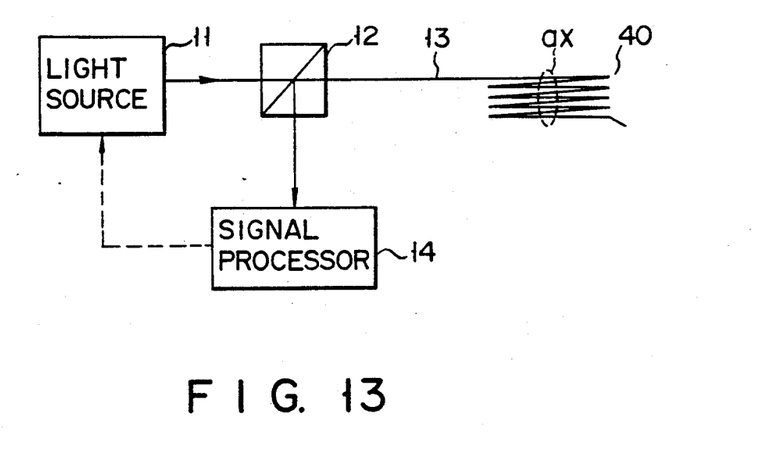
Figure 14A:
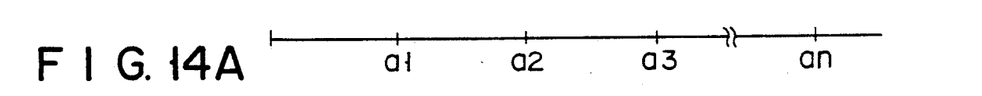
Figure 14B:
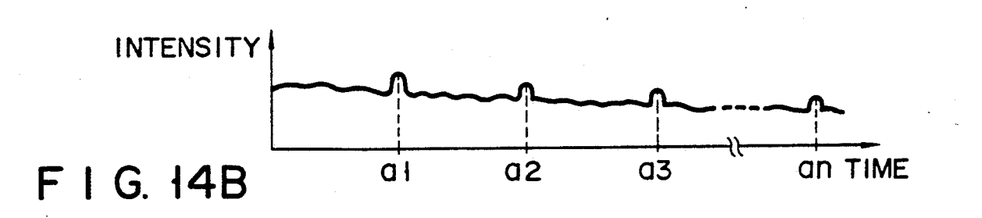
Figure 14C:
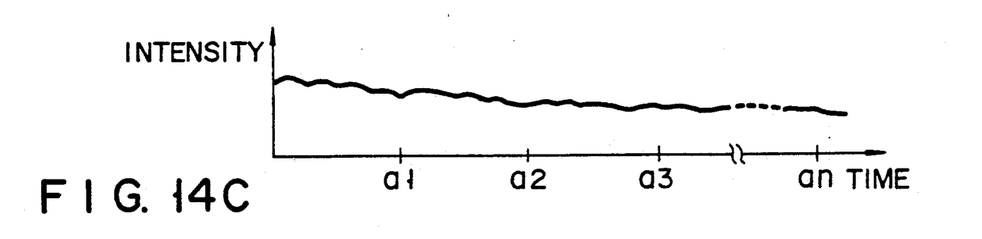

FIG. 13 shows an arrangement in which an optical fiber 13 is folded a plurality of times in a measurement region 20 so as to form a measurement portion 40. A portion ax of the measurement portion 40 is defined such that when the measurement portion 40 is developed, positions a1, a2, . . . are set as shown in FIG. 14A.

According to the arrangement shown in FIG. 13, the portion ax is set at a predetermined temperature in advance, and a light pulse is radiated on the optical fiber 13. As a result, the intensities of backscattered light components which are different from those of other light components and correspond to the predetermined temperature can be obtained at time points a1, a2, . . . , corresponding to the positions a1, a2, . . . , as shown in FIG. 14B. The obtained signal can be used as references for detecting arbitrary temperatures at the positions a1, a2, . . . . The signal processor 14 stores time points and intensities corresponding to the positions a1, a2, . . . in the file 148 (FIG. 3). The signal processor 14 samples the intensities of backscattered light components obtained in actual measurement of temperatures, e.g., intensities shown in FIG. 14C in synchronism with the times a1, a2, a3, . . . , and stores the sampled values. After sampling is performed in this manner, the data processor 147 reads out the sampled values from the memory, and measures temperatures on the basis of the sampled values. By averaging the obtained temperatures, the temperature of the measurement portion 40 can be detected with high sensitivity and high resolution.

Figure 15A:
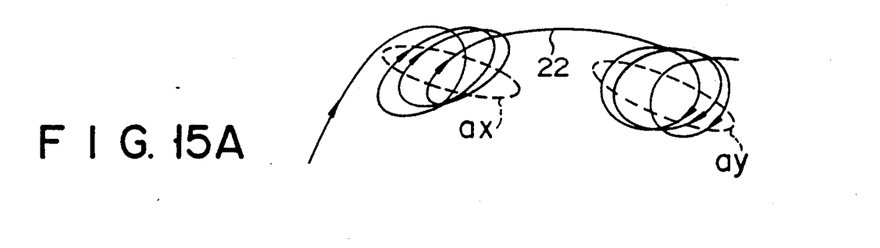
Figure 15B:
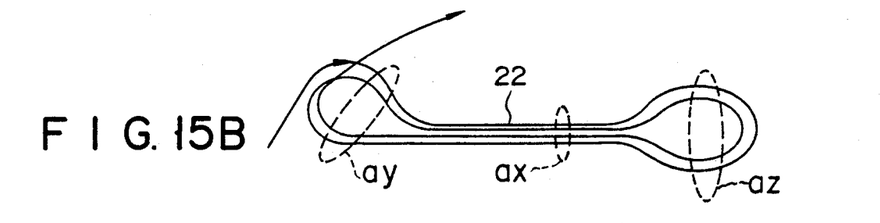
Figure 15C:
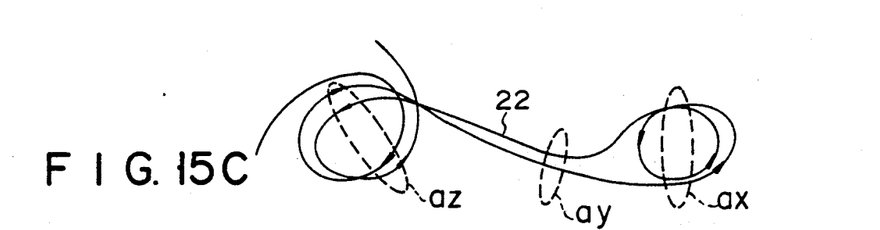

In addition to the manner of arranging the optical fiber 13 in the measurement region 20 which is shown in FIG. 13, the optical fiber 13 may be arranged in manners shown in, e.g., FIGS. 15A to 15C. Positions indicated by symbols ax, ay, and az in FIGS. 15A to 15C serve as, e.g., sampling positions.

The fifth embodiment of the present invention will now be described below with reference to FIGS. 16 and 17.

When the temperature or the like of a measurement region 20 is to be measured from a remote place, temperatures at positions between the incidence end of an optical fiber 13 and the measurement region 20 need not be measured.

Figure 16:
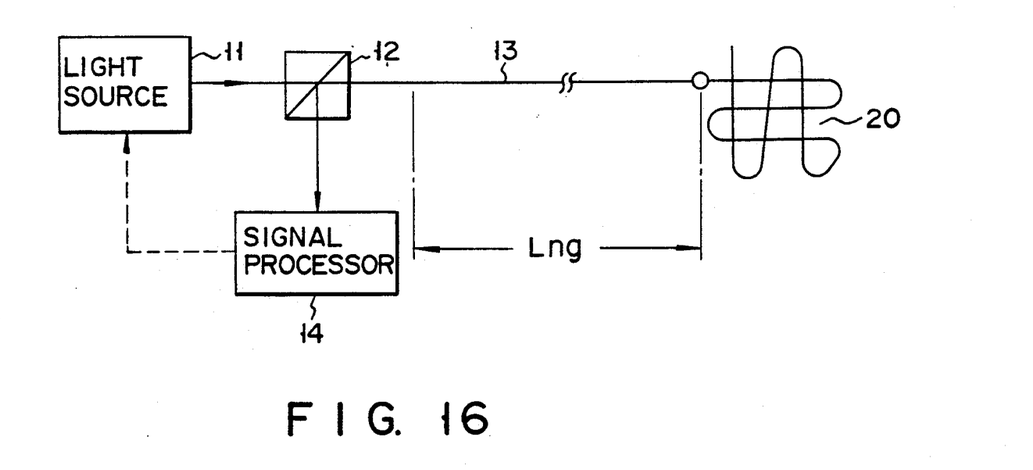
FIGS. 16 and 17 are views for explaining the fifth embodiment of the present invention.

In the arrangement shown in FIG. 16, a time corresponding to a length Lng $\times 2/$C (C is light velocity) is stored in the file 128. The high speed analytical processor 146 measures a time from the instant at which the light source 11 emits a light pulse. The high speed analytical processor 146 starts to sample backscattered light components and to store the sampled data in the internal memory at a time point at which the time stored in the file 148 has elapsed. By employing such an arrangement, the memory capacity of the high speed analytical processor 146 can be reduced, and the efficiency of data processing can be improved.

Figure 17:
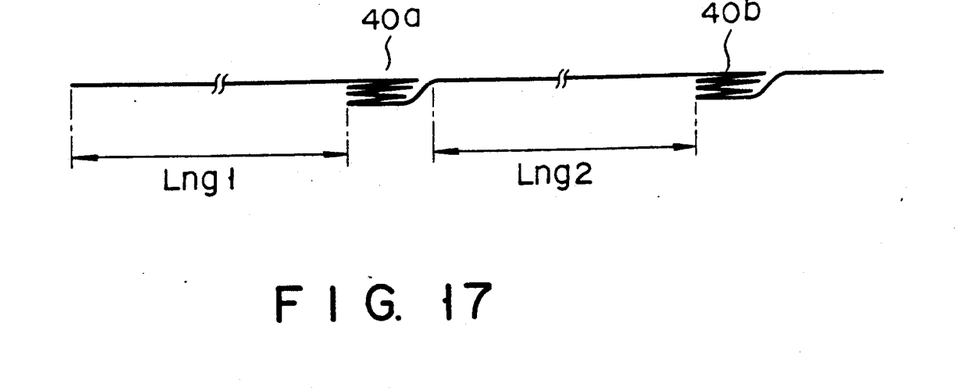

Note that if the intervals between measurement portions 40a, 40b, . . . are long, these intervals may be defined as non-measurement portions Lng so that sampling of data in the intervals is stopped, as shown in FIG. 17.

Figure 18:
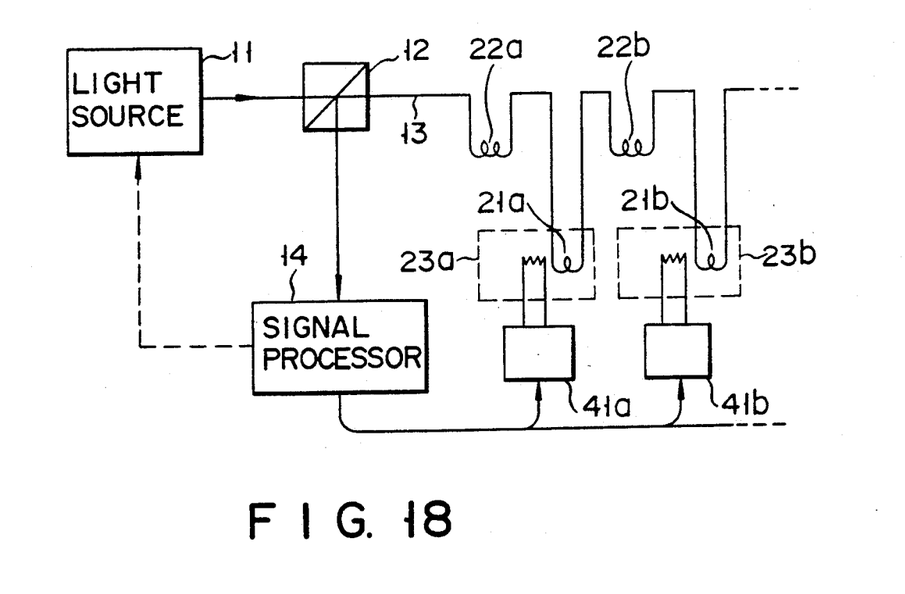
FIG. 18 is a block diagram showing an arrangement of the six embodiment of the present invention.

The sixth embodiment of the present invention will now be described below with reference to FIG. 18. FIG. 18 shows an arrangement in which controllers 41a, 41b, . . . are respectively arranged for temperature setting units 23a, 23b, . . . such as the isothermal chambers shown in FIG. 4. The controllers 41a, 41b, . . . change or hold temperatures set by the temperature setting units 23a, 23b, . . . .

The signal processor 14 outputs control signals to the controllers 41a, 41b, . . . , respectively, so as to control the temperature setting units 23a, 23b, . . . .

An operation of the arrangement in FIG. 18 will now be described below. The signal processor 14 measures the intensities of backscattered light components in an initial state, and measures temperatures set by the temperature setting units 23a, 23b, . . . . Subsequently, the signal processor 14 outputs control signals to the controllers 41a, 41b, . . . , respectively, so as to control the temperatures set by the temperature setting units 23a, 23b, . . . to coincide with the actual measurements. With this operation, these set temperatures are regarded as the temperatures of the measurement portions 21a, 21b, . . . .

In the above-described embodiments, the distances from the incidence end to the temperature setting units 23a, 23b, . . . , the connection portions 28a, 28b, . . . , and the like are actually measured in advance, and an optical signal is actually radiated on the optical fiber 13 so that the propagation time and average velocity of a light pulse in the optical fiber 13 can be obtained on the basis of the time intervals between the instant at which the light pulse is incident on the incidence end and the instant at which backscattered light components from the reference positions or the portions set at the reference temperatures are received. In this manner, the propagation time of a light pulse in a given optical fiber, which varies in each optical fiber, can be obtained from temperatures and the length of the optical fiber. Therefore, by using this technique, positions where backscattered light components are generated can be more accurately measured as compared with a case wherein measurement is simply performed by assuming a constant light velocity.

In the above-described embodiments, if a reference temperature is set between the respective measurement portions, e.g., between the measurement portions 22a and 22b, or at the measurement portions 31a, 31b, . . . , a connection portion (see FIG. 7) including a weld portion may be formed before or after, or before and after the portion at which the reference temperature is set in order to obtain a distinctive reference position signal from backscattered light. This arrangement is especially effective when the reference temperature is not much different from the temperature of the measurement region 20. In addition, crystal members which easily cause Raman scattering or crystal members sensitive to temperatures may be arranged at proper portions of the optical fiber 13 in the measurement region 20.

These crystal members may be arranged in place of the temperature setting units 23a, 23b, . . . or the connecting portions 28a, 28b, . . . .

In the above embodiments, measurement of temperatures is mainly described. However, measurement of humidities can be performed in the same manner.

Figure 19:
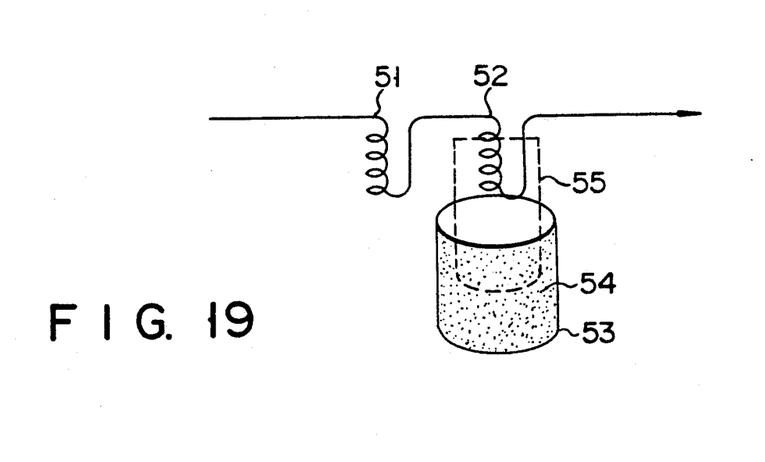
FIG. 19 is a view showing an arrangement for measurement of humidities.

A technique of measuring humidities will now be described below with reference to FIG. 19. Referring to FIG. 19, two temperature measurement portions 51 and 52 are arranged to be close to each other. The measurement portion 51 measures a normal temperature. The measurement portion 52 is wound around a cloth 55 such as gauze. One end of the cloth 55 is immersed in water 54 such as distilled water. The entire cloth 55 is dampened due to a capillary action. Therefore, the measurement portions 51 and 52 respectively correspond to a dry bulb and a wet bulb of normal thermometers.

A humidity around the measurement portion 52 can be measured by measuring temperatures t and t' of the measurement portions 51 and 52 on the basis of the intensities of backscattered light components. In this case, distilled water is used as the water 54. However, normal tap water may be manually or automatically supplied. In this case, however, a difference between measurement using distilled water and measurement using tap water must be obtained in advance.

In the above embodiments, an OTDR is used as the signal processor 14. However, the present invention is not limited to the above embodiments. For example, a well known domain reflectometry such as an optical frequency domain reflectometry (OFDR) may be used. An OFDR is a device for obtaining positions where Raman scattering occurs on the basis of the phase differences between, e.g., an incident wave and backscattered light components by using a modulation wave instead of the light pulse S.

The time intervals between the instant of radiation of a light pulse and the instant of reception of backward Raman scattered light components are difficult to measure unless they are of certain values. For this reason, an OTDR is effective when the optical fiber 13 is long.

Such a problem is not posed in an OFDR, and hence it can be used regardless of the length of the optical fiber 13.

As has been described above, according to the embodiments of the present invention, the following various effects can be obtained.

Figure 7:
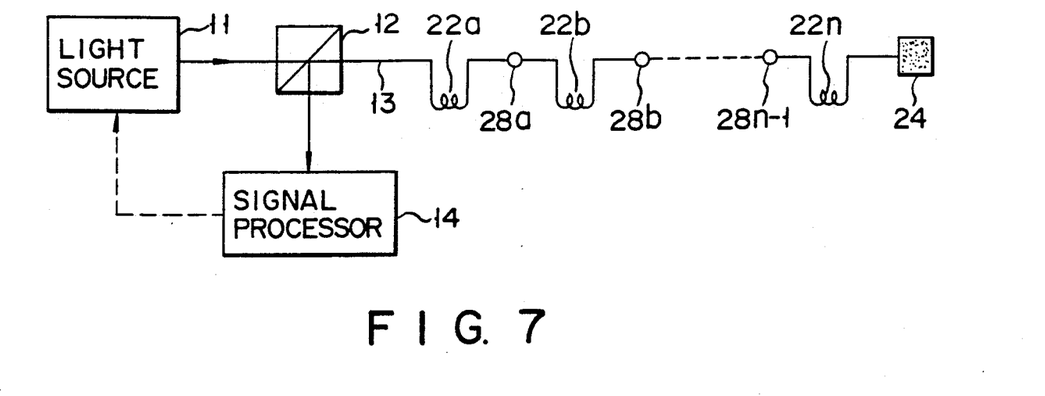
FIGS. 7 and 8 are views for explaining the second embodiment of the present invention.

For example, in the embodiments shown in FIGS. 4, 6, and 7, the positions of the respective measurement portions in a measurement region can be easily specified from the intensities of backscattered light components. In the embodiments shown in FIGS. 4 and 6, correction signals for correcting temperature measurements can be further obtained, and the temperatures and humidities, a temperature distribution, and the like at a large number of measurement portions an be accurately measured.

In the embodiments shown in FIGS. 9 and 10, an optical fiber is two-dimensionally or three-dimensionally arranged, and predetermined positions of the optical fiber are set at a predetermined temperature so as to acquire data in advance. With this arrangement, the temperatures and humidities at a large number of measurement portions in a wide measurement region can be accurately measured in actual measurement.

In the embodiments shown in FIGS. 13 and FIGS. 15A to 15C, an optical fiber is caused to cross one measurement place a plurality of times so that measurement sensitivity and resolution can be increased by averaging the intensities of backscattered light components returning from the same position at different timings.

In the embodiments shown in FIGS. 16 and 17, since no data processing is performed for backscattered light components from non-measurement portions of an optical fiber, the memory capacity of a signal processor can be reduced, and the data processing speed can be increased.

In the embodiment shown in FIG. 18, measurement values can be very accurately obtained by controlling set temperatures to coincide with actual measurements.

In each embodiment, the propagation time of light in an optical fiber can be accurately measured.

Additional advantages and modifications will readily occur to those skilled in the art. Therefore, the invention in its broader aspects is not limited to the specific details, representative devices, and illustrated examples shown and described. Accordingly, various modifications may be made without departing from the spirit or scope of the general inventive concept as defined by the appended claims and their equivalents.

What is claimed is:

1. An apparatus for measuring a temperature of an optical fiber by radiating light on said optical fiber and measuring Raman scattered light generated in said optical fiber, comprising:
   optical fiber means which is installed to pass through a plurality of places where temperatures are to be measured and which transmits light;
   a light source of radiating light on said fiber means;
   receiving means for receiving Raman scattered light, which is generated in said optical fiber means in response to the light radiated on said optical fiber, as a signal;
   calculating means for analyzing the signal received by said receiving means and calculating a position at which the Raman scattered light is generated and a temperatures at the position; and
   adding means for adding a signal representing at least one of the position at which the Raman scattered light component is generated and a predetermined temperature to the signal constituted by the Raman scattered light component;
   wherein said adding means comprises temperature setting means for setting, at a predetermined temperature, a plurality of predetermined positions of said optical fiber means; said temperature setting means includes means for setting, a said predetermined temperature, both sides of one position of said optical fiber means where said optical fiber means passes through one of said plurality of places where temperatures are to be measured, in order to clarify the location of said one place and to distinguish said one place from the other of said places; and said calculating means detects said one portion as a temperature measurement portion.

2. An apparatus according to claim 1, wherein said temperature setting means sets a temperature which is considerably different from an estimated temperature at the place where a temperature is to be measured.

3. An apparatus according to claim 1, wherein said temperature setting means comprises:
   means for setting predetermined positions of said optical fiber means at a predetermined reference temperature prior to actual temperature measurement,
   means for causing said light source means to emit light, and
   storage means for controlling said receiving means and said calculating means to obtain and store data representing the predetermined positions from the Raman scattered light; and
   said calculating means comprises:
   means for specifying the Raman scattered light from a measurement position on the basis of the data stored in said storage means upon actual temperature measurement, and
   means for calculating a temperature on the basis of the specified Raman scattered light.

4. An apparatus according to claim 1, wherein said optical fiber means is installed to pass one measurement place a plurality of times.

5. An apparatus according to claim 1, wherein said adding means comprises:
   control means for controlling a set temperature of said setting means, said control means using the temperature at the predetermined position obtained by said calculating means as the set temperature.

6. An apparatus according to claim 1, wherein said adding means adds a signal representing a position, and said calculating means obtains a propagation time of an optical signal in said optical fiber means on the basis of the signal representing the position.

7. An apparatus according to claim 1, wherein said calculating means includes means for measuring a humidity from a temperature difference between two adjacent portions.

8. An apparatus according to claim 1, wherein said optical fiber means is wound a plurality of times around each of a plurality of concentric imaginary spheres within a tank, and parts of said optical fiber means which extend between said plurality of imaginary spheres are drawn out of the tank and set at said predetermined temperature by said temperature setting means.

9. An apparatus according to claim 1, wherein said receiving means comprises:
   means for sampling the received Raman scattered light;
   means for storing a sampled signal; and
   means for inhibiting Raman scattered light from a non-measurement portion of said optical fiber means from being stored in said storage means.

10. An apparatus according to claim 4, wherein said calculating means includes means for receiving Raman scattered light from portions, in one measurement place, of said optical fiber means at different timings, obtaining temperatures on the basis of the received Raman scattered light, and obtaining a measurement value by averaging the obtained temperatures.

11. An apparatus for measuring a temperature of an optical fiber by radiating light on said optical fiber and measuring Raman scattered light generated in said optical fiber, comprising:
   optical fiber means which is installed to pass through a plurality of places where temperatures are to be measured and which transmits light;
   a light source for radiating light on said optical fiber means;
   receiving means for receiving Raman scattered light, which is generated in said optical fiber means in response to the light radiated on said optical fiber means, as a signal;
   calculating means for analyzing the signal received by said receiving means and calculating a position at which the Raman scattered light is generated and a temperature at the position; and
   adding means for adding a signal representing at least one position of said optical fiber means to the signal constituted by the Raman scattered light component, said adding means including a welded portion of said optical fiber means, a crystal grain buried in said optical fiber means, and a connecting portion of said optical fiber means, said calculating means, detecting in which of said plurality of places a temperature is measured, in accordance with light from said adding means.

12. An apparatus for measuring a temperature of an optical fiber by radiating light on said optical fiber and measuring Raman scattered light generated in said optical fiber, comprising:
- optical fiber means which transmits light and is installed to pass through one place, at least one other place, and hereafter said one place again, temperatures being measured in said one place and said at lest one other place;
- a light source for radiating light on said fiber means;
- receiving means for receiving Raman scattered light, which is generated in said optical fiber means in response to the light radiated on said optical fiber means, as a signal; and
- calculating means for analyzing the signal received by said receiving means and calculating a position at which the Raman scattered light is generated and a temperature at the position, said calculating means calculating the temperature of said one place on the basis of Raman scattered light generated in at least two portions of said optical fiber means where said optical fiber means passes through said one place.

13. An apparatus according to claim 12, further comprising:
- means for setting predetermined positions of said optical fiber means at a predetermined reference temperature prior to actual temperature measurement;
- means for causing said light source to emit light; and
- storage means for controlling said receiving means and said calculating means to obtain and store data representing the predetermined positions from the Raman scattered light; and
- said calculating means comprising:
- means for specifying the Raman scattered light from a measurement position on the basis of the data stored in said storage means upon actual temperature measurement; and
- means for calculating a temperature on the basis of the specified Raman scattered light.

14. An apparatus according to claim 12, wherein said calculating means derives temperatures of said one place on the basis of Raman scattered light components generated in at least two portions of said optical fiber means where said optical fiber means passes through said one place, and calculates an average of the temperatures derived, thus determining the temperature of said one place.

15. An apparatus for measuring a temperature of an optical fiber by radiating light on said optical fiber and measuring Raman scattered light generated in said optical fiber, comprising:
- optical fiber means which is installed to pass through at least one place where a temperature is to be measured and transmits light;
- a light source for radiating light a plurality of times on said optical fiber means;
- receiving means for receiving Raman scattered light, which is generated in said optical fiber means in response to the light radiated on said optical fiber means, as a signal;
- calculating means for analyzing a plurality of times the signal received by said receiving means and calculating a position at which the Raman scattered light is generated and a temperature at the position; and
- adding means for adding a signal representing at least one position of said optical fiber means to the signal constituted by the Raman scattered light component;
- wherein said receiving means comprises:
- means for sampling the received Raman scattered light;
- means for storing a sampled signal; and
- means for inhibiting Raman scattered light from a nonmeasurement portion of said optical fiber means for being stored in said storage means.

16. An apparatus for measuring a temperature of an optical fiber by radiating light on said optical fiber and measuring Raman scattered light generated in said optical fiber, comprising:
- optical fiber means which is installed to pass through a plurality of places where temperatures are to be measured and which transmits light;
- a light source for radiating light on said fiber means;
- receiving means for receiving Raman scattered light, which is generated in said optical fiber means in response to the light radiated on said optical fiber means, as a signal; and
- calculating means for analyzing the signal received by said receiving means and calculating a position at which the Raman scattered light is generated and a temperature at the position;
- wherein said optical fiber means is arranged to pass through at least one place where humidity is measured, first and second points close to each other being located in the vicinity of said at least one place, a wet cloth being provided at the second point; and
- said calculating means includes means for deriving temperatures at the first and second points close to each other, on the basis of Raman scattered light components from the first and second points, and for calculating the humidity of said at least one place, in accordance with the difference between the temperatures derived.

* * * * *